(12) United States Patent
Hokkanen

(10) Patent No.: US 6,876,853 B2
(45) Date of Patent: Apr. 5, 2005

(54) METHOD AND DEVICE FOR PERFORMING HANDOVER USING LOCATION INFORMATION

(75) Inventor: Tuomo Hokkanen, Helsinki (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/982,589

(22) Filed: Oct. 17, 2001

(65) Prior Publication Data

US 2002/0072371 A1 Jun. 13, 2002

Related U.S. Application Data

(63) Continuation of application No. PCT/EP99/02966, filed on Apr. 30, 1999.

(51) Int. Cl.[7] .................................... H04Q 7/20
(52) U.S. Cl. ................ 455/440; 455/438; 455/439; 455/456.1; 455/434; 455/436
(58) Field of Search .................. 455/436, 440, 455/446, 438, 439, 456.1, 414.2, 434

(56) References Cited

U.S. PATENT DOCUMENTS

| | | | |
|---|---|---|---|
| 5,546,445 A | | 8/1996 | Dennison et al. |
| 6,038,449 A | * | 3/2000 | Corriveau et al. ......... 455/439 |
| 6,208,631 B1 | * | 3/2001 | Kim ........................ 370/332 |
| 6,324,406 B1 | * | 11/2001 | Zadeh ....................... 455/456 |

FOREIGN PATENT DOCUMENTS

| | | |
|---|---|---|
| DE | 19741701 A1 | 3/1999 |
| WO | WO 93/19560 | 9/1993 |
| WO | WO 98/52375 | 11/1998 |
| WO | WO 99/07167 | 2/1999 |

* cited by examiner

Primary Examiner—Lee Nguyen
Assistant Examiner—Eugene Yun
(74) Attorney, Agent, or Firm—Squire, Sanders & Dempsey L.L.P.

(57) ABSTRACT

In the present invention, a method for performing a handover procedure for a movable mobile station communicating in a communication network is disclosed. The communication network includes a plurality of base transceiver stations adapted to communicate with mobile stations within its coverage area. The method includes processing location information related to the mobile station and position information related to the base transceiver stations. The method also includes deciding, based on the result of the processing, whether a first handover condition is fulfilled and designating a next base transceiver station in the network to communicate with the mobile station. When the first handover condition is fulfilled, a handover of the mobile station from the current base transceiver station to the next designated base transceiver station is triggered. A corresponding device for controlling handover is also disclosed. Base transceiver stations that do not permanently transmit a broadcast control channel or base stations which can be turned off when no subscribers are within the coverage area may be used.

23 Claims, 3 Drawing Sheets

METHOD AND DEVICE FOR PERFORMING HANDOVER USING LOCATION INFORMATION

This application if a continuation of PCT/EP99/02966 Apr. 30, 1999.

FIELD OF THE INVENTION

The present invention relates to a method for performing a handover procedure for a mobile station movable in a communication network between different cells, and also to a corresponding device. In particular, the present invention is directed to a method and a corresponding device using location information for performing the handover procedure.

BACKGROUND OF THE INVENTION

As is commonly known a mobile communication network such as a GSM-system is hierarchically structured as follows. A mobile services switching center MSC controls at least one base station controller BSC. One base station controller in turn controls at least one base transceiver station BTS which covers a designated communication area. Said communication area or coverage is called a cell. The base transceiver station communicates with a respective mobile station MS within this cell.

When the mobile station moves within the communication network it has to be ensured that the connection between the mobile station and the communication network is not interrupted even when the mobile station leaves the cell (i.e. the coverage area) of one base transceiver station and enters another cell. The procedure used for maintaining connection is referred to as a handover.

During such a handover procedure the connection of the mobile station to the communication network is changed from one cell to another cell. Additionally, this base transceiver station handover can be combined with a base station controller handover when the respective base transceiver stations are controlled by different base station controllers. Moreover, a handover can also occur between two mobile services switching centers in a corresponding case. Furthermore, a handover is also possible between communication networks using different technologies such as a handover between a GSM network and a wideband code division multiple access (WCDMA) network or between a GSM network and a radio local area network (RLAN).

To decide whether a handover is necessary, certain measurements are required. By these measurements, e.g., a signal quality, such as quality of the connection, signal strength, bit error rate and the like, is checked for several monitored base transceiver stations. The corresponding results are used to decide whether a handover is required. For example, the signal strength of the current base transceiver station decreases while the signal strength of another base transceiver station increases. If a signal strength ratio reaches a predetermined level (i.e., the signal quality of the currently used base transceiver station is lower than a predetermined threshold level), a handover from the currently used base transceiver station to the other base transceiver station having a better signal quality will be initiated.

To inform the mobile station as to which base transceiver stations are available (i.e. in which coverage areas the mobile station is) and to make necessary information for said measurement available, the base transceiver stations use signaling channels to send and receive this information. One of said signaling channels is a broadcast control channel (BCCH) which is permanently broadcasted by a respective base transceiver station, e.g. in a certain timeslot of a TDMA frame. Said BCCH can be compared with a radio beacon of the base transceiver station, wherein via said BCCH the first contact between the mobile station and the base transceiver station is established. The BCCH is also used to inform the mobile station about access parameters and the like and to enable a position determination.

On the other hand, a handover can also be required in the case, that there is to much traffic in the corresponding cell. Each cell has a limited number of traffic channels (TCH) used for data exchange or speech transmission. If a subscriber wants to make a call but no more TCH is available because of to many currently active calls, a handover is performed to another cell with an available TCH, even if measurement of, e.g., signal strength results in a lower value for this new cell.

It is to be noted, that a handover procedure can be o executed during a call setup phase and during an active call.

However, as only a limited number of channels is available, a permanent transmission of a channel like said BCCH is wasteful in terms of the radio communication resources of the communication network.

Additionally, each of the base transceiver stations of the communication network has permanently to be turned on to transmit said BCCH, even if there is no mobile station present within its coverage area. This results in an unnecessary power waste.

Document U.S. Pat. No. 5,546,445 describes a method and a system in which both a position controlled system and a signal strength system are included in a cellular system, a mobile telecommunications switching office can include a software system in a memory to use the position controlled system, but to also test signal strength, and to use a signal strength controlled system if a signal still falls below a predetermined value when making call management decisions based on the position of a mobile unit.

Document WO 99/07167 concerns a geographical restriction in a cellular telecommunication network. There is disclosed a o method for performing a handover in which tariff related information are taken into consideration.

Document WO 93/19560 describes a method for performing a handover in which a serving base transceiver stations seeks base transceiver stations for a handover which are not adjacent to the serving base transceiver station.

Document DE 197 41 701 A1 describes a method and a device for a handover of a mobile station in a mobile radio o system. A base station is connected to a radio positioning system and receives positioning signals. Coordinates of a mobile station are calculated on the basis of the coordinates of the base stations communicating with the mobile station and a distance between the mobile station and the base stations.

SUMMARY OF THE INVENTION

Therefore, it is an object of the present invention to o provide an improved method which enables to perform a handover procedure while maintaining a better use of available radio resources, and to provide a correspondingly improved device for performing said handover procedure.

According to the present invention, this object is achieved by a method for performing a handover procedure for a mobile station communicating in a communication network and being movable therein, said communication network comprising a plurality of base transceiver stations being adapted to perform a communication with said mobile station within its coverage area, said method comprising the steps of processing location information related to the mobile station by comparing it with position information related to the base transceiver stations, deciding on the basis of the result of said processing, whether a first handover condition is fulfilled, and checking subscriber specifications concerning another measurement for a handover, designating a next base transceiver station in said communication network, to which the communication with said mobile station is to be directed from a current base transceiver station, when the first handover condition is fulfilled, triggering a handover of the communication connection of the mobile station from the current base transceiver station to the next base transceiver station designated in said designating step, and performing the handover.

Furthermore, the present invention proposes a device for controlling a handover procedure for a mobile station communicating in a communication network and being movable therein, said communication network comprising a plurality of base transceiver stations being adapted to perform a communication with said mobile station within its coverage area, said device comprising a processing means for processing location information related to said mobile station by comparing it with position information related to base transceiver stations, and for deciding on the basis of the result of said processing, whether a first handover condition is fulfilled, and for checking subscriber specifications concerning another measurement for a handover, a designating means for designating a next base transceiver station in said communication network, to which the communication with said mobile station is to be switched from a current base transceiver station, when the first handover condition is fulfilled, and a triggering means for triggering a handover of the communication connection of the mobile station from the current base transceiver station to the next base transceiver station designated by said designating means.

Advantageous further developments of the present invention are as set out in the respective dependent claims.

According to the present invention, the proposed method and/or device use location information which is, for example, periodically determined to decide whether a handover is to be performed and to which base transceiver station the communication connection is to be changed. This allows the usage of base transceiver stations which do not transmit a broadcast control channel, since the handover is initiated by the corresponding network device, e.g., the base station controller BSC. This decreases the system interference level and increases the network capacity by reducing channels not directly used for communication.

Furthermore, base transceiver stations can be used which can be turned off. Said base transceiver stations are only turned on by the corresponding base station controller when a mobile station is within the coverage area of said base transceiver stations. This saves costs and reduces power consumption.

Preferred embodiments of the invention are described herein below in detail by way of example with reference to the accompanying drawings.

DESCRIPTION OF PREFERRED EMBODIMENTS

Figure 1:
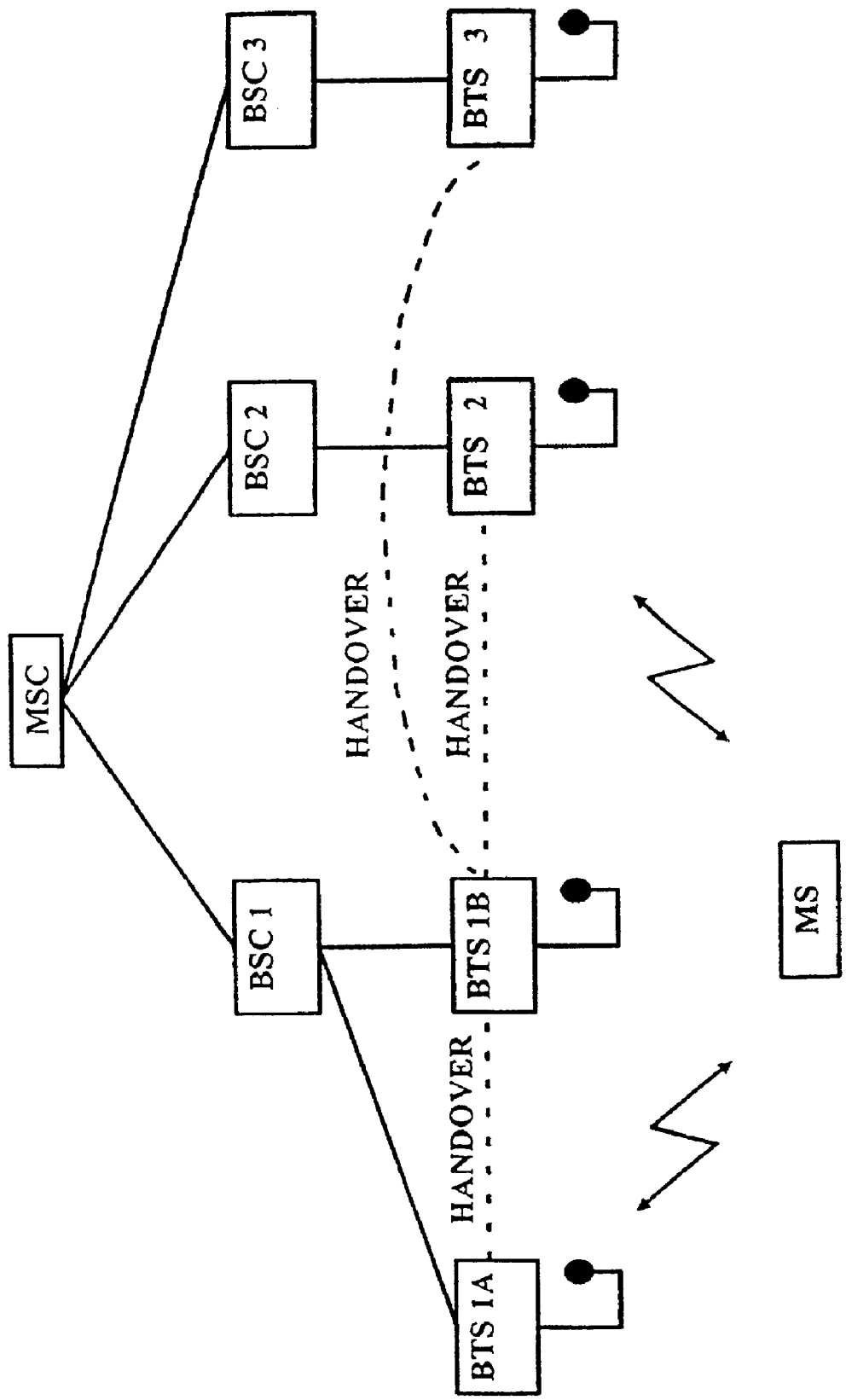
FIG. 1 shows in detail a basic structure of a communication network.

FIG. 1 shows a basic structure of a communication network, for example, in a GSM system. A mobile station MS moves in said communication network. Said communication network comprises at least one mobile services switching center MSC which controls the communication network. Said mobile services switching center MSC is connected to one or more base station controllers BSC 1, BSC 2 and BSC 3. Each of said base station controllers is connected to and controls respective base transceiver stations BTS 1A, BTS 1B, BTS 2 and BTS 3. The base transceiver stations have a respective coverage area in which they are adapted to perform a communication with said mobile station MS. Said coverage area is called a cell.

As mentioned above, when the mobile station is moved within said communication area and, for example, a signal quality of a cell currently connected with the mobile station MS is decreasing, a handover procedure can be required. The different possibilities of handover are indicated by dotted lines. These possibilities are a handover between cells of one base station controller BSC 1 (BTS 1A to BTS 1B) or between cells of different base station controllers BSC1 and BSC2 (BTS 1B to BTS 2). Another possibility indicated is a handover from BTS 1B to BTS 3. This is part of a second embodiment which will be described later.

It is obvious, that the control for the handover procedure is in a network element, such as in a base station controller BSC or in the mobile services switching center MSC, depending on which hierarchic level the handover takes place. In the following, a case is described in detail with reference to FIG. 2, in which a handover procedure according to the invention occurs between base transceiver stations BTS 1A and BTS 1B of the same base station controller BSC 1.

Figure 2:
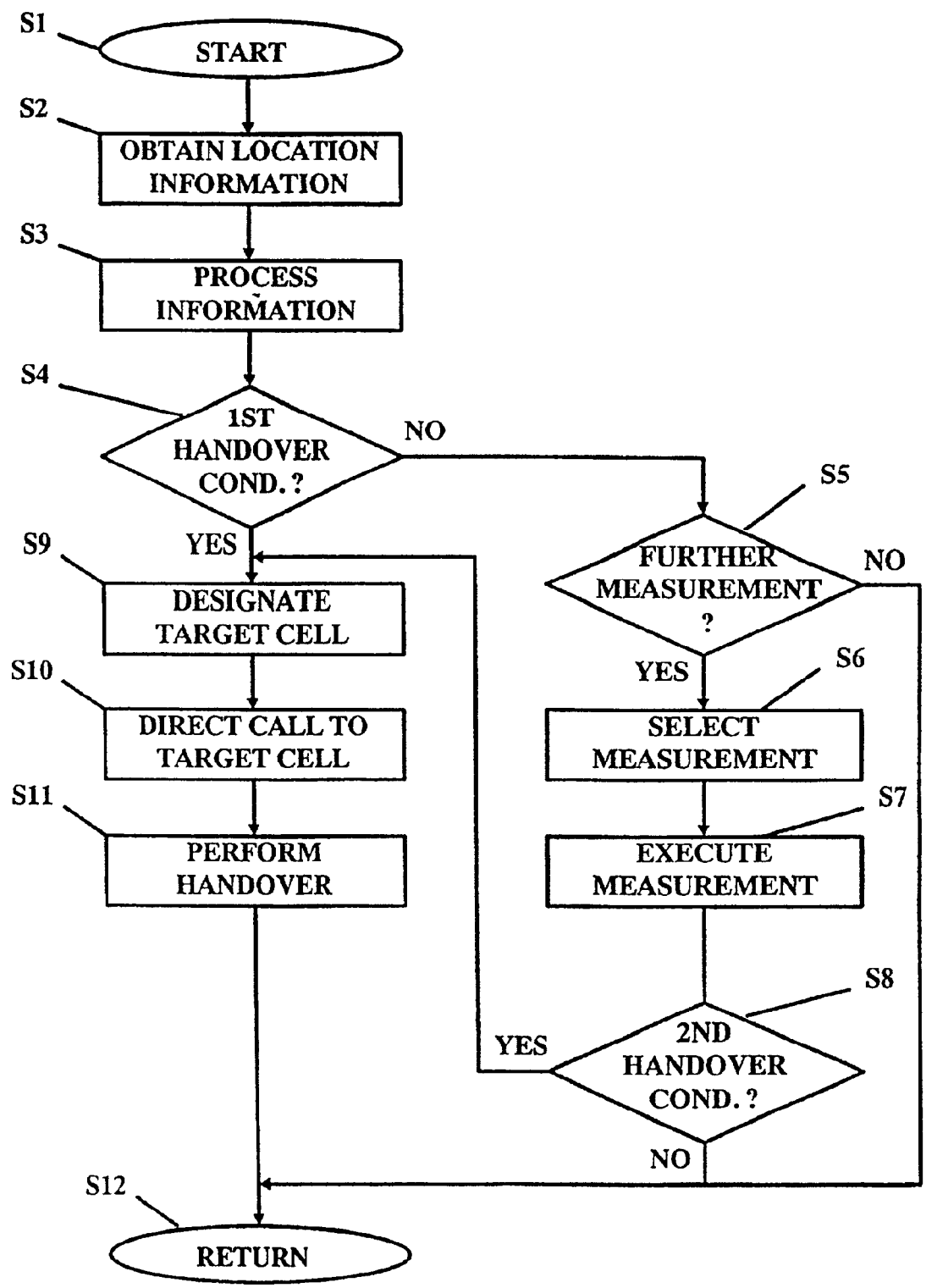
FIG. 2 shows a flowchart of a handover procedure according to the present invention in a communication network according to FIG. 1.

With reference to FIG. 2, the handover procedure according to the invention is described. After the mobile station MS has established a communication connection with the network (step S1), a location information obtaining step S2 is performed. Said location information obtaining step S2 comprises determining of the location related to said mobile station MS and transferring said obtained location information to a network device (here, to the BSC 1) for further processing.

Determining the location related to a mobile station MS can be performed by different methods. For example, the global positioning system (GPS) is used for such a purpose. Further, known measurement methods like an observed time difference (OTD) or a time of arrival (TOA) can be employed for a location determination. Also, a combination of said measurements is possible. The technology for locating a mobile station is already used in E911 services, which grant a position determination of a mobile station provided with a corresponding equipment.

Said location determination can be executed by GPS, TOA, OTD or the like, as mentioned above. The location determination can be, for example, triggered periodically. The period and the kind of location measurement can be subscriber specific. Furthermore, the location determination can be performed in the mobile station MS or in a respective network element, such as a base transceiver station BTS, depending on which location determination method is employed (e.g. when using GPS, in the mobile station MS).

Location information obtained in said location information obtaining step S2 referring to the location of the mobile station MS is transferred to a respective network element BSC 1. However, as mentioned above, if the handover procedure is performed between base transceiver stations of different base station controllers, information is transmitted to the mobile services switching center MSC, since the MSC performs control for the latter kind of handover.

In the described case, the location information is processed in the base station controller BSC 1 (step S3). Within said processing, the transmitted location information is compared with known position information of base transceiver stations, e.g. BTS 1B, to examine, for example, when the mobile station MS is within the coverage area of a adjacent base transceiver station, thereby fulfilling a handover condition. Said position information relating to the base transceiver stations also comprises information of the coverage area of the respective cell and of directional pattern of the respective base transceiver station.

After processing the location information, it is decided in step S4 based on the location information processed in said processing step S3, whether a (first) handover condition is fulfilled, e.g., because of a movement of the mobile station MS in the coverage area of said base transceiver station BTS 1B and due to a decreasing in the signal quality. If the decision in step S4 is YES, a base transceiver station in said communication network is designated as a target for the handover (step S9). Said designated base transceiver station is, for example, the BTS 1B, to which the communication connection will be directed from the currently used base transceiver station BTS 1A.

In step S10 the communication connection of the mobile station MS to the communication network is directed from the current base transceiver station BTS 1A to the next base transceiver station BTS 1B designated in said designating step S9. Thereafter, the handover is performed (step S11) and the procedure returns to step S1 (step S12).

If the decision in step S4 is NO, a step S5 follows, in which it is checked, whether further measurements are to be executed. This can be on subscriber specific. If no further measurements are to be executed, the process proceeds to step S12.

If the decision in step S5 is YES, a measurement to be performed is selected (step S6), e.g., on basis of subscriber specifications. Said measurement is for example an availability of traffic channels, a signal strength or the like. In step S7, the designated measurement is executed.

Subsequently, in step S8, the measurement result is verified. If the measurement result indicates no need for a handover (e.g. enough traffic channels are available) the process proceeds to step S13. on the other hand, if the measurement result indicates a (second) handover condition (decision in step S8 is YES), said second handover condition is given back to the target cell designation step S9 for performing a handover (S10, S11).

Figure 3:
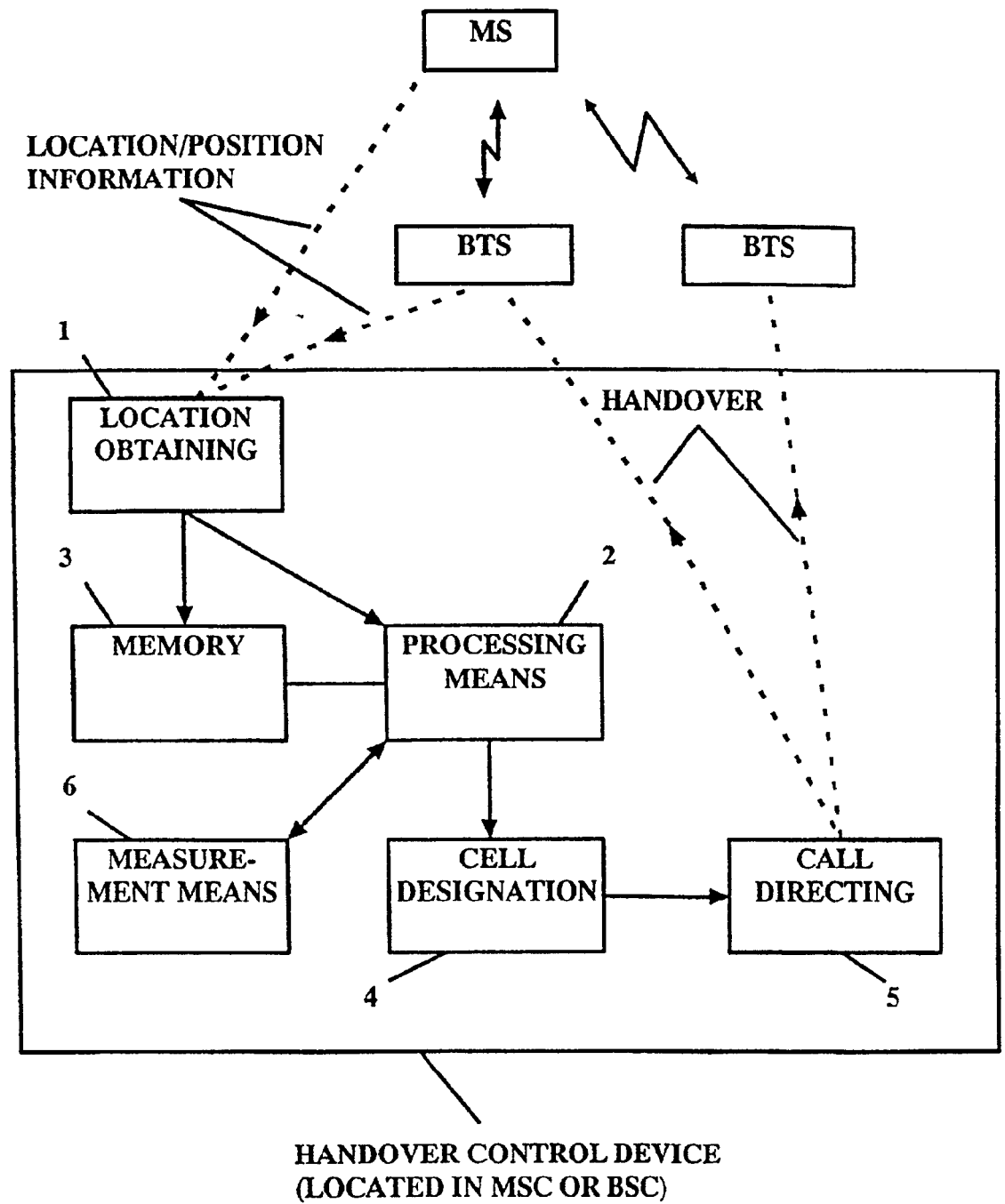
FIG. 3 shows a block circuit diagram of a device for controlling a handover procedure according to the present invention.

With reference to FIG. 3, a device for controlling the handover procedure described above with reference to FIG. 2 is described. Namely, a case is described in detail in which a handover procedure according to the invention occurs between base transceiver stations BTS 1A and BTS 1B of the same base station controller BSC 1. However, also a handover in another hierarchic level, as mentioned above, can be controlled by an corresponding device.

Said device includes a location obtaining means 1 for obtaining location information related to said mobile station MS. The location obtaining means 1 receives location information related to the mobile station MS from the mobile station MS itself or from the current base transceiver station BTS (indicated by dotted lines), depending on which respective locating method is used for location determination (global positioning system GPS, time of arrival TOA, observed time difference OTD or the like), as mentioned above. To simplify matters, the location information from the mobile station itself is directed directly to the location obtaining means 1, although it is easy to understand that it is directed via an air interface to the base transceiver station BTS and therefrom to the location obtaining means 1.

The location determination can be, for example, triggered periodically. The period and the kind of location measurement can be subscriber specific.

The received location information is forwarded by said location obtaining means 1 to a processing means 2 and a memory means 3. Said processing means 2 process the location information related to the mobile station MS and position information of the base transceiver stations BTS (in this case, the position and coverage area information of BTS 1B). Said position information is stored in said memory means 3. Also, the location information related to the mobile station MS is stored in said memory means 3.

The processing means 2 compares the location of the mobile station MS and the position information of the base transceiver stations BTS. On the basis of said comparison, the processing means 2 decides, whether a first handover condition is fulfilled, for example, when the mobile station moves within another base transceiver station coverage area. If the first handover condition is fulfilled, a target cell designating means 4 designates a target base transceiver station (in this case the BTS 1B) in said communication network, to which the communication connection is to be directed from the current base transceiver station BTS 1A.

A triggering means 5 performs the handover of the communication connection of the mobile station MS from the current base transceiver station BTS 1A to the new base transceiver station BTS 1B designated by said designating means 4 by forwarding correspondent commands.

If the above mentioned first handover condition is not fulfilled, the processing means 2 can cause a further measurement. Therefore, the device includes a measurement means 6 which checks, whether a measurement is to be performed, e.g. because the first handover condition is not fulfilled. This can be subscriber specific.

The measurement means 6 selects a kind of measurement (e.g., availability of traffic channels, signal strength or the like) and executes the selected measurement. Thereafter, the measurement means 6 verifies, whether a measurement result indicates a second handover condition. If said measurement result indicates the second handover condition, the measurement means 6 reports said result to the processing means 2 for performing a handover.

It is to be noted, that the location obtaining means (1) is a dedicated network element, which can be a part of another network element (such as mobile station MS on the user side or base station controller BSC at the network side). The necessary information for determining the location of the mobile station MS are, for example, received from a network element (e.g. transceiver station BTS) or from a system not included in the communication network (GPS-satellite).

As mentioned above, as a second embodiment, there is a third possibility of performing a handover in the communication network according to FIG. 1. In this case, the cell or base transceiver station BTS 3, to which the connection is changed, is not adjacent to the original base transceiver station BTS 1B. To take said base transceiver station BTS 3 into consideration at the processing step S4 according to FIG. 2, it has to be stored as possible target cell. It can be stored in the memory means 3 according to FIG. 3, but also in a (not shown) subscriber identity module SIM which identifies the subscriber in the communication network by stored data, or in the mobile station itself.

In the examples described above, the handover is performed when location information and additional information (e.g., signal quality) indicate the need for such a handover. However, it is also possible, that the present invention operates in such way, that on basis of the location information a handover is prevented, even when a measurement of signal quality indicates that the communication connection becomes worse. On the other hand, the location information can be used in such way, that, on basis of said location information, the handover is triggered, even if the signal quality is still good.

The present invention is applicable especially to indoor communication networks like the GSM Indoor and Office (GIO) concept. Such a indoor communication network comprises many small cells for many subscribers in a small area. The movement of mobile stations therein is rather limited, but communication traffic in such a network is very high in special times (weekdays during the working time). On the other hand, there are only a few subscribers in some cells in other times (besides working time). Therefore, a part of the base transceiver stations can be turned off during the latter times. The corresponding cells are turned on and off by the respective network device controlling the handover. In the above described case this is the base station controller BSC 1.

Moreover, the present invention is applicable to network solutions in a subway or the like, as trains (with mobile stations therein) are only moving in respective one direction during special periods of time. Therefore, only needed cells are to be turned on.

However, it is easy understood, that the application field of the present invention is also in other microcellular communication network structures.

Furthermore, it is obvious, that the present invention is applicable to any handover procedure such as an inter cell handover, an inter BSC handover, an inter MSC handover and also to a handover between communication networks using different technologies (handover between a GSM network and a wideband code division multiple access (WCDMA) network or between a GSM network and a radio local area network (RLAN)).

In the present invention, a method is proposed for performing a handover procedure for a mobile station MS communicating in a communication network and being movable therein, said communication network comprising a plurality of base transceiver stations being adapted to perform a communication with said mobile station MS within its coverage area, said method comprising the steps of processing (S3) location information related to the mobile station MS and position information related to the base transceiver stations BTS 1A, BTS 1B, BTS 2, BTS 3, deciding (S4) on the basis of the result of said processing S3, whether a first handover condition is fulfilled, designating (S9) a next base transceiver station in said communication network, to which the communication with said mobile station MS is to be directed from a current base transceiver station, when the first handover condition is fulfilled, triggering a handover S10 of the communication connection of the mobile station MS from the current base transceiver station to the next base transceiver station designated in said designating step S10, and performing (S11) the handover.

Furthermore, a corresponding device for controlling said handover is proposed. The advantage of the present invention is, that base transceiver stations can be used which do not permanently transmit a broadcast control channel or which can be turned off, when no subscribers are within the coverage area.

It should be understood that the above description and accompanying figures are merely intended to illustrate the present invention by way of example only. The preferred embodiments of the present invention may thus vary within the scope of the attached claims.

What is claimed is:

1. A method for performing a handover procedure for a mobile station communicating in a communication network and being movable therein, said communication network comprising a plurality of base transceiver stations being adapted to perform a communication with said mobile station within a coverage area of a respective one of said base transceiver stations, said method comprising the steps of processing location information related to the mobile station by comparing position information of the mobile station with position information related to the base transceiver stations, deciding on the basis of the result of said processing of said location information, whether a first handover condition based on said location information is fulfilled or not, wherein said first handover condition is based on said location information and indicates that a handover is necessary for establishing or maintaining the communication between the mobile station and the communication network, when the first handover condition is not fulfilled, checking subscriber specifications, whether or not another measurement, which is related to a handover and is not based on said location information, is to be performed, wherein said another measurement results in a determination of a second handover condition indicating that a handover is necessary for establishing or maintaining the communication between the mobile station and the communication network, selecting a measurement of availability of traffic channels as the type of the further measurement, if the another measurement is to be performed, executing the measurement of availability of traffic channels selected in said selecting step, verifying, whether the measurement of availability of traffic channels results in a second handover condition, and if the result of said verifying step indicates that the second handover condition is fulfilled, designating a next base transceiver station in said communication network, to which the communication with said mobile station is to be directed from a current base transceiver station, when the first handover or the second handover condition is fulfilled, triggering a handover of the communication connection of the mobile station from the current base transceiver station to the next base transceiver station designated in said designating step, and performing the handover.

2. A method according to claim 1, wherein in said processing step at least one additional parameter is processed together with said location information related to the mobile station and position information related to the base transceiver stations.

3. A method according to claim 2, wherein said additional parameter is based on a signal quality.

4. A method according to claim 1, further comprising a location information obtaining step comprising
a step of determining said location information related to the mobile station and
a step of transmitting said determined location information to a respective network device adapted to perform said processing step.

5. A method according to claim 4, wherein said step of determining said location information related to the mobile station is executed in the mobile station.

6. A method according to claim 4, wherein said step of determining said location information related to the mobile station is executed in a network element on the network infrastructure side.

7. A method according to claim 4, wherein said step of determining said location information related to the mobile station is based on at least one of the following methods:
locating by a global positioning system;
locating by a time of arrival;
locating by an observed time difference.

8. A method according to claim 4, wherein said location information obtaining step is executed periodically.

9. A method according to claim 4, wherein said location obtaining step is executed upon predetermined occasions.

10. A method according to claim 9, wherein said predetermined occasion is an attachment procedure of the mobile station to the communication network.

11. A method according to claim 1, wherein a coverage area of the base transceiver station designated in said designating step and to which the communication connection is to be directed is a coverage area adjacent to the coverage area of the current base transceiver station.

12. A method according to claim 1, wherein a coverage area of the base transceiver station designated in said designating step and to which the communication connection is to be directed is a coverage area not adjacent to the coverage area of the current base transceiver station.

13. A method according to claim 12, wherein the coverage area not adjacent to the coverage area of the current base transceiver station to which the communication is to be directed is known to the communication network.

14. A method according to claim 13, wherein the base transceiver station with the coverage area not adjacent to the coverage area of the current base transceiver station, to which the communication connection is to be directed, is a predetermined base transceiver station.

15. A method according to claim 14, wherein the position information of the predetermined base transceiver station is stored in a subscriber identity module or in the mobile station.

16. A device for controlling a handover procedure for a mobile station communicating in a communication network and being movable therein,
said communication network comprising
a plurality of base transceiver stations being adapted to perform a communication with said mobile station within a coverage area of a respective one of said base transceiver stations, said device comprising
a processing means for processing location information related to said mobile station by comparing position information of the mobile station with position information related to base transceiver stations, and for deciding on the basis of the result of said processing of said location information, whether a first handover condition based on said location information is fulfilled or not, wherein said first handover condition is based on said location information and indicates that a handover is necessary for establishing or maintaining the communication between the mobile station and the communication network, for checking, when the first handover is not fulfilled, subscriber specifications, whether or not another measurement which is related to a handover and is not based on said location information is to be performed, wherein said another measurement results in a determination of a second handover condition indicating that a handover is necessary for establishing or maintaining the communication between the mobile station and the communication network, and for designating a next base transceiver station in said communication network, to which the communication with said mobile station is to be directed from a current base transceiver station, when the first handover condition or the second handover condition is fulfilled, and
a triggering means for triggering a handover of the communication connection of the mobile station from the current base transceiver station to the next base transceiver station designated by said designating means
the device further comprising
a measurement means being responsive to the subscriber specifications and adapted to
check, whether the another measurement is to be performed,
select a measurement of availability of traffic channels as the type of the further measurement, if the another measurement is to be performed,
execute the measurement of availability of traffic channels selected,
verify, whether the measurement of availability of traffic channels results in a second handover condition,
and if the result of the verification indicates that the second handover condition is fulfilled, forward the measurement result to said handover condition processing means for performing the handover.

17. A device according to claim 16, wherein
in said processing means at least one additional parameter is processed together with said location information related to the mobile station and position information related to the base transceiver stations.

18. A device according to claim 17, wherein
said additional parameter is based on a signal quality.

19. A device according to claim 16, further comprising means
for determining location information related to the mobile station and
for transmitting said determined location information to a respective network device performing said processing.

20. A device according to claim 19, further comprising a memory means for memorizing location information related to the mobile station and position information related to the base transceiver stations.

21. A device according to claim 19, wherein said means for determining location information related to the mobile station and for transmitting said determined location information to a respective network device performing said processing are located in the mobile station.

22. A device according to claim 19, wherein said means for determining location information related to the mobile station and for transmitting said determined location information to a respective network device performing said processing are located in a network element on the network infrastructure side.

23. A device according to claim 19, wherein said means for determining the location information related to the mobile station is adapted to perform said determination according to at least one of the following methods:

locating by a global positioning system;

locating by time of arrival;

locating by an observed time difference.

* * * * *